G. W. BULLEY.
RUBBER WORKING MACHINE.
APPLICATION FILED MAR. 10, 1917. RENEWED MAY 21, 1918.

1,290,505.

Patented Jan. 7, 1919.
2 SHEETS—SHEET 1.

Witness:
R. L. Farrington

Inventor,
George W. Bulley.
By Brown, Nissen & Sprinkle
Attys.

G. W. BULLEY.
RUBBER WORKING MACHINE.
APPLICATION FILED MAR. 10, 1917. RENEWED MAY 21, 1918.

1,290,505.

Patented Jan. 7, 1919.
2 SHEETS—SHEET 2.

Witness:
R. L. Farrington

Inventor,
George W. Bulley,
By Brown, Nissen & Sprinkle
Att'ys

UNITED STATES PATENT OFFICE.

GEORGE W. BULLEY, OF ST. JOSEPH, MICHIGAN.

RUBBER-WORKING MACHINE.

1,290,505.  Specification of Letters Patent.  Patented Jan. 7, 1919.

Application filed March 10, 1917, Serial No. 153,833. Renewed May 21, 1918. Serial No. 235,856.

*To all whom it may concern:*

Be it known that I, GEORGE W. BULLEY, a citizen of the United States, residing at St. Joseph, in the county of Berrien and State of Michigan, have invented certain new and useful Improvements in Rubber-Working Machines, of which the following is a specification.

My invention relates to mixing machines, and more particularly to machines which are adapted for mixing and compounding rubber, and the like.

One object of my invention is the provision of a machine adapted to effect maximum mixing of the materials making up the rubber compound, and the like, or one in which the compounding materials are distributed evenly and thoroughly throughout the rubber.

A further object is the provision of a machine of the character mentioned which is adapted to separate the mass of material passing through the machine and by conducting the parts at different speeds to bring different parts together upon the return of the divided mass before the latter is discharged from the machine.

Other objects will appear hereinafter.

An embodiment of my invention is shown in the accompanying drawings, forming a part of this specification, and in which—

Figure 1:
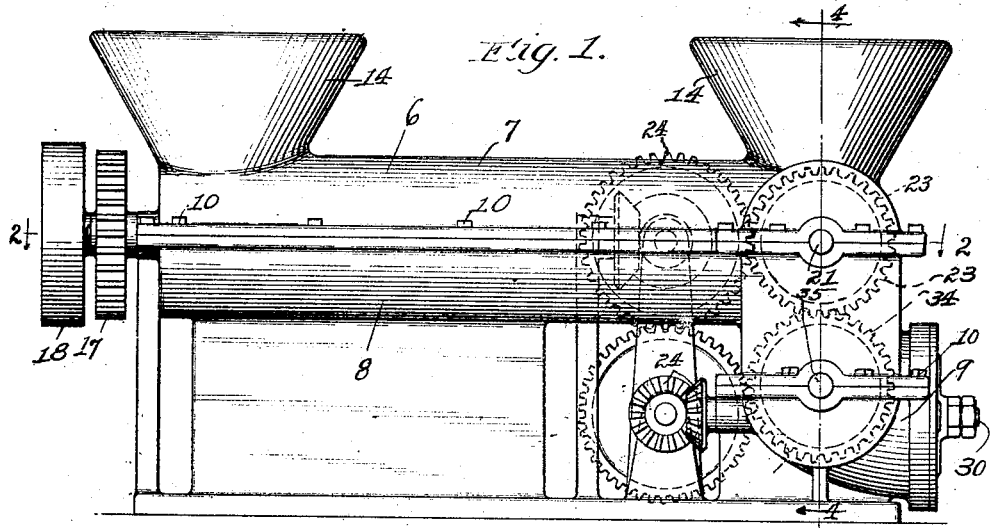
Figure 1 is a side elevation of a mixing or compounding machine embodying my invention.
Figure 2:
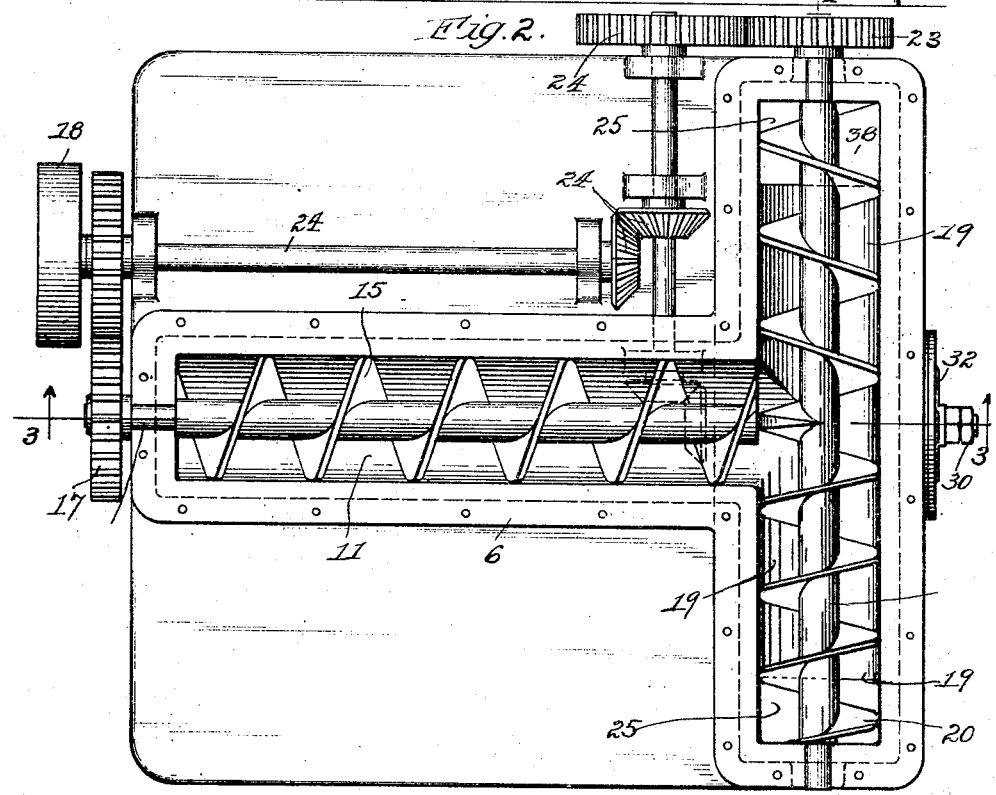
Fig. 2 is a section taken on line 2—2 of Fig. 1.
Figure 3:
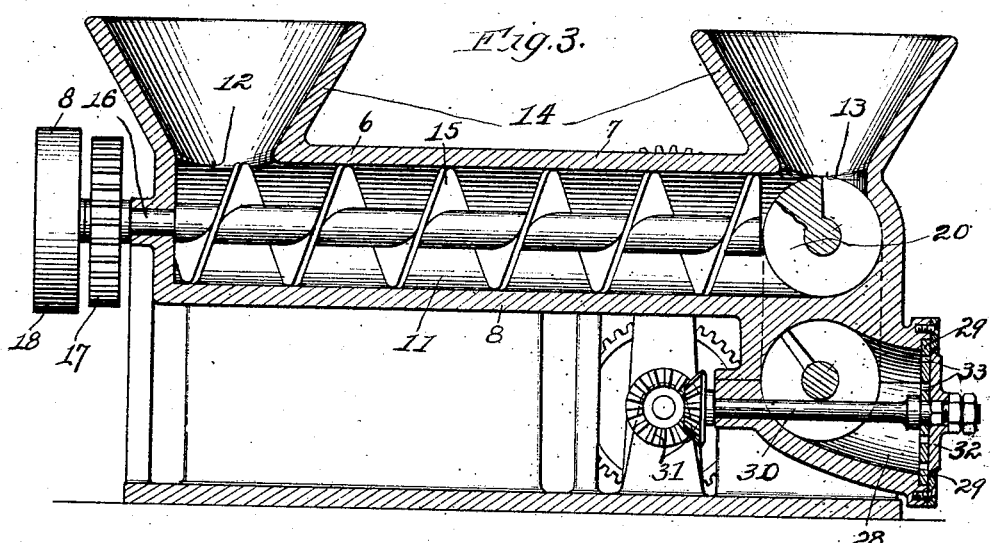
Fig. 3 is a section taken on line 3—3 of Fig. 2.
Figure 4:
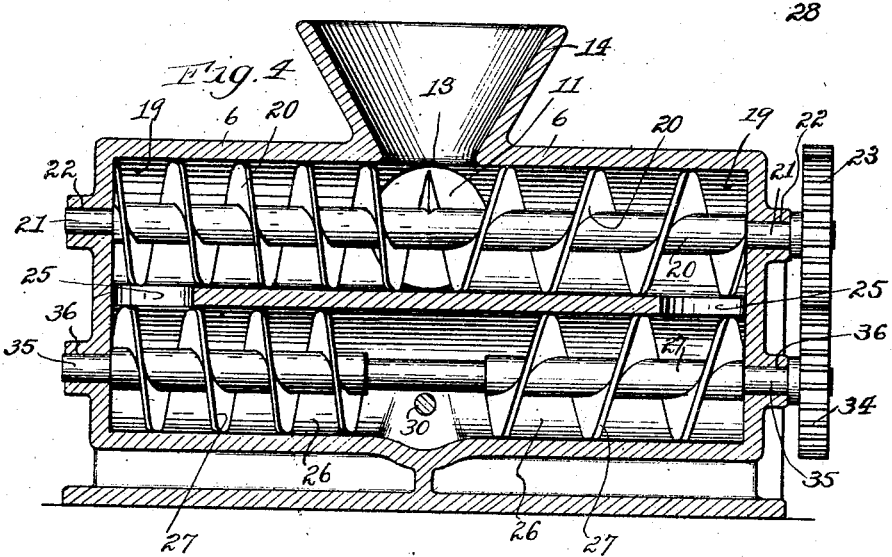
Fig. 4 is a section taken on line 4—4 of Fig. 1.
Figure 5:
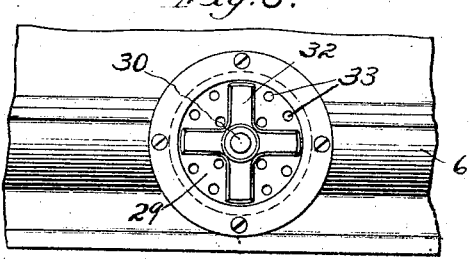
Fig. 5 is a fragmental view showing the discharge opening of the machine.

The mixing machine shown, described and claimed herein is designed to carry out the method of mixing and compounding rubber constituting the subject matter of my co-pending application, Serial No. 154,968, filed Mar. 15, 1917.

Referring more particularly to the drawings, I have illustrated a machine comprising a casing 6 made up, in the present instance, of three parts 7, 8 and 9. The parts 7, 8 and 9 are secured together by bolts or screws 10, or when so desired, in any other manner. The casing also may be made of more or less parts when desired. The casing 6 has a passage or chamber 11 substantially tubular in form, which has a feed opening 12 at one end, and a feed opening 13 at its other end. At each feed opening is a hopper 14 which facilitates directing materials into the chamber 11. In the chamber 11 I have shown a screw member 15 mounted in a manner to rotate therein with the periphery of the screw adapted to engage the inner periphery of the casing so that materials around the screw will engage the casing and adhere thereto in a manner to cause the materials to become mixed, or the other materials distributed throughout the rubber during the process of moving the materials through said chamber. The screw 15 is provided with a stem or shaft 16 which is journaled at one end in the casing 6, and provided on its end which extends through the casing with a gear wheel 17 and a pulley 18, the pulley 18 is adapted to be connected with any suitable source of power for operating the screw member 15. I have not shown a bearing member in the chamber 11 adjacent the feed opening 13, but one may provide a bearing for this end of the shaft when so desired. In the present machine the inner bore of the chamber 11 provides a bearing for this end of the screw member 15.

At the end of the chamber 11, adjacent the feed opening 13, I have provided a substantially tubular chamber 19 at right angles to the chamber 11, with the chamber 11 opening into the central portion of chamber 19. In the chamber 19 I provide a screw member 20 which is journaled at its end portions 21 in suitable bearings 22 in the casing 6. One end 21 of the screw member 20 is provided with a gear 23 which is connected to a train of gearing 24 with the gear 17 on the screw member 15. The screw member 20 is provided with right and left hand threads so that it will divide materials fed from the screw 15 and conduct such materials toward its ends. I also provide one end of the screw with threads of shorter pitch than the other end so that the material will be fed more slowly toward one end than the other. The reason for this will be set forth hereinafter.

At the ends of chamber 19 I provide openings 25 which open into the end portions of a chamber 26 similar to chamber 19. In the chamber 26 I provide a screw member 27 similar to screw member 20. The screw member 27 has its threads formed part right hand and part left hand with the threads on one end of the screw having a greater pitch than on the other. This screw is adapted to carry the material from the ends of chamber 26 to the central portion thereof and force such material outwardly through a chamber 28 and die member 29 to discharge the material from the machine. The die member 29 is provided with a central opening in which is mounted a shaft 30, and the latter connected by a train of gears 31 with the gear 23. On the shaft 30 may be provided a knife 32 adapted to sever the particles of material squeezed out through the openings 33 of the die member 29. The knife 32 may be dispensed with when so desired, together with its driving gearing. The gear 23 is connected to the screw member 27 by means of a gear 34 meshing therewith. The gear 34 is mounted on the ends 35 of the screw member 27 in bearings 36 in casing 6.

In the operation of a machine embodying my invention, it will be apparent that by placing the desired materials in the feed opening 12, such materials will be carried through the chamber 11 as a single mass by screw 15, and at the same time said screw, coöperating with the inner walls of the chamber 11, will manipulate and mix said materials of the mass and cause the particles of the materials to be distributed throughout the mass. As the mass of material passes from the chamber 11 into the chamber 19 it divides into two masses or streams which are taken in opposite directions by the threads of the screw 20. Since the threads are of different pitch the screw acts to move the two masses of material in the chamber 19 at relatively different speeds. The two streams or masses pass through the openings 25 at the ends of chamber 19 and are thereupon taken up by the second screw 27. This second screw is also provided with threads of different pitch and likewise progresses the masses of material differentially, bringing the masses together again substantially at the center of the chamber 26. It will be understood that the material is constantly subjected to a manipulating and mixing action during progress through the chambers, and when the masses meet again at the center of the chamber 26 they intermix and are manipulated in passing out of the passage 28 and discharge openings 33. On account of the differential movement of the masses through the chambers 19 and 26 it will be observed that the portions of the original mass will be widely distributed and differently associated and intermixed when the mass emerges from the discharge openings of the machine. Because of the peculiar nature of rubber this method of mixing and distributing the compounds results in an especially homogeneous or evenly mixed compound without the danger of "over-milling" the material. The advantage of the single preliminary screw 15 and the two feeding hoppers lies in the fact that some of the ingredients may be mixed or partially mixed into the mass of rubber before other ingredients are added.

From this it will be apparent any number of feed openings may be provided and open into the casing at desirable points. It will also be apparent that the number of screw conveyers and chambers therefor may be added to in order to effect sufficient mixing of the ingredients upon once going through the machine.

While I have illustrated and described the preferred form of my invention, I do not desire to be limited to the precise details set forth, but desire to avail myself of such variations and changes as come within the scope of the appended claims.

I claim:—

1. A mixing machine comprising a casing having a plurality of elongated passages, there being communicating openings between the passages; mixing conveyer members in and substantially fitting the bores of said passages, said conveyer members and passages being arranged to divide material and bring it back together again in the casing; and means for operating the conveyers.

2. A mixing machine comprising two conveyers, one disposed at an angle to the other and adapted to deposit material against the side of said other conveyer, said last-mentioned conveyer being adapted to separate material discharged thereagainst and move such material laterally from the first-mentioned conveyer; and means for conducting material from the remote end portions of the second-mentioned conveyer back together into a single mass of material.

3. A mixing machine comprising a casing having two communicating passages disposed at an angle to each other; a conveyer in one passage adapted to move material from said passage into the other passage; a conveyer in the second-mentioned passage adapted to divide said material and move the latter to the remote ends of such passage, there being a communication between the ends of the second-mentioned passage for conducting material from the latter back into a single mass of material.

4. A mixing machine comprising two substantially parallel conveyers in communication at their ends, one conveyer being adapted to receive material at its central portion and move such material to its end portions, and the other conveyer being adapted to receive said material at its end portions and move such material to its central portion.

5. A mixing machine comprising a casing having two substantially parallel elongated passages therein connected together at their ends, one of the passages having a receiving opening at its central portion and the other passage having a discharge end at its central portion; a conveyer in one of the passages adapted to divide material and move the latter from the receiving opening to both ends of one of the passages; and a conveyer in the other passage adapted to move material from the ends of the last-mentioned passage to the discharge opening.

6. A mixing machine comprising a casing inclosing a plurality of chambers communicating at their ends; a mixing and conveying member in each chamber, one of said members being adapted to move materials from the central portion of one chamber to the ends thereof, moving such materials faster toward one end than toward the other end, and the other conveyer being adapted to move materials from the ends of another chamber to the central portion thereof, moving such materials faster from one end than from the other; and means operating said members.

7. A mixing machine comprising a casing; mixing members in the casing adapted to divide materials into parts to mix each part separately and then to bring together and intermix the parts with the particles thereof associated with different particles than they were before said division.

8. A mixing machine comprising a casing inclosing two substantially cylindrical chambers comunicating at their ends, there being a feed opening at the central portion of one chamber and a discharge opening at the central portion of the other chamber; a mixing screw in each chamber, each screw having a right hand and a left hand threaded portion with the right and left hand threads of different pitches so as to move and mix materials at relatively different speeds; and means connected with said screws adapted to rotate the latter and move materials from the receiving opening through said chambers to the discharge opening.

9. A mixing machine comprising a casing inclosing two substantially cylindrical chambers comunicating at their ends, there being a feed opening at the central portion of one chamber and a discharge opening at the central portion of the other chamber; mixing screws in and substantially filling said chambers; and means operating said screws and moving materials from said receiving opening to both ends of one of the chambers and from the ends of the other chamber to said discharge opening, moving the materials toward one end of the first-mentioned chambers faster than toward the other end of such chamber.

10. A mixing machine comprising a hollow casing having a receiving opening and a discharge opening therein; a plurality of mixing and conveying members therein adapted to divide materials into two portions, to mix the particles of each portion, conveying one portion faster through the machine than the other portion and then bring the portions together again and intermix them in different rotations than before the material was divided.

11. The combination of a casing having a mixing chamber and a mixing member therein for mixing and progressing the material in said chamber as a mass, and a plurality of differentially operating mechanisms arranged to divide the mass, progress the divisions thereof at different relative speeds and re-mass and manipulate the divisions.

12. The combination of a plurality of rubber mixing and manipulating mechanisms having a common discharge chamber and having relatively differentially acting manipulators arranged to deliver masses of material at relatively different speeds into said chamber, means for resisting the discharge of material from said chamber to cause the intermixing of the masses therein, and a common mixing and manipulating mechanism having means for manipulating a single mass of material and supplying divisions thereof to said differential mechanisms.

13. The combination of a casing having two substantially parallel tubular chambers communicating at their ends, and one of said chambers having feed opening intermediate its ends and the other a discharge opening intermediate its ends, differentially acting manipulating screws operating to move the materials from the feed opening to the ends of one of the said chambers, similar differentially acting screws operating to move the material from the ends to the discharge opening of the other chamber, a casing having a common tubular mixing chamber disposed at right angles to said other chambers and communicating at one end with said feed opening, a mixing and manipulating screw operating to progress material in said common chamber to said feed opening, and a hopper at the other end of said common chamber.

14. The combination of a casing having two substantially parallel tubular chambers communicating at their ends, and one of said chambers having a feed opening intermediate its ends and the other a discharge opening intermediate its ends, differentially acting manipulating screws operating to move the material from the feed opening to the ends of one of said chambers, similar differentially acting screws operating to move the material from the ends to the discharge opening of the other chamber, a casing having a common tubular mixing chamber disposed at right angles to said other chambers and communicating at one end with said feeding opening, a mixing and manipulating screw operating to progress material in said common chamber to said feed opening and a plurality of hoppers disposed at different points in said casings whereby material may be supplied thereto.

In testimony whereof I have signed my name to this specification on this 7th day of March, A. D. 1917.

GEORGE W. BULLEY.

Copies of this patent may be obtained for five cents each, by addressing the "Commissioner of Patents, Washington, D. C."